United States Patent
Sastry et al.

(10) Patent No.: US 9,209,679 B2
(45) Date of Patent: Dec. 8, 2015

(54) METHOD AND APPARATUS FOR TRANSFERRING POWER BETWEEN AC AND DC POWER SYSTEMS

(71) Applicant: ABB Technology AG, Zurich (CH)

(72) Inventors: Jyoti Sastry, San Jose, CA (US); Tomas U. Jonsson, Västerås (SE); Jiaqi Liang, Cary, NC (US); Alireza Nami, Västerås (SE); Frans Dijkhuizen, Skultuna (SE)

(73) Assignee: ABB Technology AG, Zurich (CH)

( * ) Notice: Subject to any disclaimer, the term of this patent is extended or adjusted under 35 U.S.C. 154(b) by 194 days.

(21) Appl. No.: 14/132,633

(22) Filed: Dec. 18, 2013

(65) Prior Publication Data
US 2015/0171741 A1 Jun. 18, 2015

(51) Int. Cl.
*H02J 1/10* (2006.01)
*H02M 1/42* (2007.01)
(Continued)

(52) U.S. Cl.
CPC .............. *H02M 1/4233* (2013.01); *H02M 1/10* (2013.01); *H02M 1/12* (2013.01); *H02M 1/44* (2013.01); *H02M 7/1626* (2013.01); *H02M 7/19* (2013.01); *H02M 7/44* (2013.01)

(58) Field of Classification Search
CPC ....... H02M 7/66; H02M 7/757; H02M 7/797; H02M 7/155; H02M 7/1555; H02M 7/1557; H02M 7/162; H02M 7/1623; H02M 7/1626
USPC ........................ 363/65–66, 71–72, 95, 97–98, 363/123–124, 131–132
See application file for complete search history.

(56) References Cited

U.S. PATENT DOCUMENTS 3,887,859 A * 6/1975 Hubner .................... 318/810
4,177,508 A * 12/1979 Schmid .................... 363/78
(Continued)

FOREIGN PATENT DOCUMENTS

| SE | 464843 B | 6/1991 |
| WO | 9522848 A1 | 8/1995 |
| WO | 2012130296 A1 | 10/2012 |

OTHER PUBLICATIONS

Bao, J., et al., "Multilevel Current Source Inverter Topologies Based on the Duality Principle," Twenty-Fifth Annual IEEE Applied Power Electronics Conference and Exposition (APEC), 2010, pp. 1097-1100.
(Continued)

*Primary Examiner* — Jeffrey Gblende
(74) *Attorney, Agent, or Firm* — Murphy Bilak & Homiller, PLLC

(57) ABSTRACT

In one aspect of the teachings herein, a self-commutated current source converter is operated in a manner that compensates for the reactive power consumption and/or harmonics generation of a line-commutated current source converter used in the transfer of electrical power between an AC power system and a DC power system. In this regard, the line-commutated current source converter is operated as a first converter in a hybrid converter apparatus and the self-commutated current source converter is operated as a second converter in the hybrid arrangement. According to one example, the first and second converters are stacked, such that each shares a portion of the DC voltage on the DC side of the hybrid converter apparatus, while in another example, the second converter is not used for power conversion and instead is used solely for compensation with respect to the first converter.

16 Claims, 14 Drawing Sheets

(51) Int. Cl.
*H02M 7/162* (2006.01)
*H02M 7/44* (2006.01)
*H02M 1/10* (2006.01)
*H02M 1/44* (2007.01)
*H02M 1/12* (2006.01)
*H02M 7/19* (2006.01)

(56) References Cited

U.S. PATENT DOCUMENTS

| | | | |
|---|---|---|---|
| 5,535,113 A | | 7/1996 | Konishi |
| 2009/0015071 A1* | | 1/2009 | Iwata et al. ............ 307/77 |
| 2012/0069610 A1 | | 3/2012 | Trainer et al. |
| 2012/0081939 A1* | | 4/2012 | Hasler ............ 363/126 |
| 2012/0113699 A1 | | 5/2012 | Crookes et al. |
| 2014/0133198 A1* | | 5/2014 | Koyama et al. ............ 363/40 |

OTHER PUBLICATIONS

Lindberg, L., "Voltage Source Forced Commutated Converters for High Power Transmission Applications," 1990, Stockholm, Sweden.

Bai, Z., et al., "Conformation of Multilevel Current Source Converter Topologies Using the Duality Principle," IEEE Transactions on Power Electronics. Sep. 2008. pp. 2260-2267. vol. 23, No. 5.

Noguchi, T., et al., "Review of Novel Multilevel Current-Source Inverters with H-Bridge and Common-Emitter Based Topologies," Energy Conversion Congress and Exposition (ECCE), 2010 IEE. Sep. 12-16, 2010. pp. 4006-4011. Atlanta, Georgia, USA.

Liang, J., et al., "Current Source Modular Multilevel Converter for HVDC and Facts," Power Electronics and Applications (EPE), 2013 15th European Conference. Sep. 2-6, 2013. pp. 1-10.

\* cited by examiner

METHOD AND APPARATUS FOR TRANSFERRING POWER BETWEEN AC AND DC POWER SYSTEMS

TECHNICAL FIELD

The present invention generally relates to power systems, and particularly relates to power transfer between alternating current (AC) and direct current (DC) power systems.

BACKGROUND

The vast majority of electrical power transmission and distribution systems use alternating current, e.g., operating at 50 or 60 Hz. These AC systems form large interconnected networks spanning from the points of power generation to the points of power consumption and represent varying transformer-converted voltages at different parts within the system. Characteristically, the transmission portions of such systems operate at high AC voltages, to provide more efficient power transmission.

While raising the transmission voltage in such systems offers certain advantages, AC transmission has inherent problems, including the power losses associated with cyclically charging and discharging the transmission lines at the operating frequency of the system. Other issues inherent to AC transmission include the "skin effect," which describes the tendency for AC current to flow near the outer surface or skin of a solid conductor. For these and other reasons, High Voltage Direct Current, HVDC, power transmission offers compelling advantages in a number of scenarios.

For example, HVDC transmission generally will offer economic advantages where overhead transmission line lengths are >600 km, where undersea cable lengths are >50 km, where underground transmission lines are required, where AC systems of different voltages and/or frequencies require interconnection, and where precise control of transmitted power is required. As a further key advantage, HVDC interconnections provide "firewalling" between the AC systems coupled through such interconnections, thereby preventing the failure of one AC grid from catastrophically cascading into other AC grids.

ABB is a pioneer in HVDC transmission, deploying the "Gotland" link in Sweden in 1954 using a version of "HVDC Classic" technology. Converters based on HVDC Classic employ thyristors as line-commutated current source converters, for converting from AC to DC, and vice versa. DC voltage levels and the direction of power flow are controlled by controlling the firing angle of the thyristors, which are typically arranged as "valves" that comprise stacked arrays of thyristors.

FIG. 1 illustrates a generic, known arrangement for interconnecting two AC power systems 10 and 12 via an HVDC transmission link 14 that is connected on one end to the AC power system 10 by a "converter" station 16 and on the other end to the AC power system 12 by a converter station 18. On the AC side, the converter station 16 connects to the first AC power system 10 via transformer(s) 20. Likewise, the converter station 18 connects on its AC side to the AC power system 12 via transformer(s) 22. These converter stations are, for example, based on HVDC Classic technology and FIG. 2 illustrates the use of thyristors 30 in such embodiments of the converter stations 16 and 18, which also may be referred to simply as "converters."

Among their several advantages, HVDC Classic systems are robust and, with ongoing refinement and development, they offer the ability to operate reliably at high DC voltages, e.g., >500 kV. HVDC Classic systems are not without challenges, however, including those related to reactive power consumption and harmonics generation on the AC side of such converters.

Other technologies are known. For example, ABB also offers so-called HVDC LIGHT technology, which complements the use of underground transmission cables and provides power transmission in the range of 1,200 MW at DC voltages of +/−320 kV. HVDC LIGHT systems use voltage-source controlled converters that use arrays of Insulated Gate Bipolar Transistors or IGBTs. FIG. 3 illustrates a converter 32 based on IGBT switches, as an example alternative implementation for the converters 16 and 18. However, the challenges involved in scaling such technologies for operation at higher voltages means that higher DC voltage installations generally favor the use of HVDC Classic converters.

SUMMARY

In one aspect of the teachings herein, a self-commutated current source converter is operated in a manner that compensates for the reactive power consumption and harmonics generation of a line-commutated current source converter used in the transfer of electrical power between an AC power system and a DC power system. In this regard, the line-commutated current source converter is operated as a first converter in a hybrid converter apparatus and the self-commutated current source converter is operated as a second converter in the hybrid arrangement. According to one example, the first and second converters are stacked, such that each shares a portion of the DC voltage on the DC side of the hybrid converter apparatus, while in another example, the second converter is not used for power conversion and instead is used solely for compensation with respect to the first converter.

In an example embodiment, a hybrid converter apparatus is configured for coupling to an AC power system on an AC side and to a DC power system on a DC side. The hybrid converter apparatus comprises the aforementioned first and second converters, where the first converter includes a plurality of line-commutated bidirectional voltage-blocking switches coupled between first AC-side and DC-side connections and is configured for transferring electrical power between the AC and DC power systems, based on converting AC voltage to DC voltage or vice versa. The second converter includes a plurality of self-commutated bidirectional voltage-blocking switches coupled at least to the AC power system through second AC-side connections. A control circuit is configured to control commutation of the second converter, to compensate for at least one of reactive power consumption and harmonics generation by the first converter on the AC side.

In another example embodiment, a method of operating a hybrid converter apparatus includes transferring power between an AC power system and a DC power system using at least the first converter of the hybrid power apparatus. Here, the first converter is, as described above, a line-commutated current source converter. The method further includes measuring an AC current waveform arising in the AC power system from operation of the first converter, and controlling commutation of the second converter of the hybrid converter apparatus as a function of the measured AC current waveform, to compensate for at least one of reactive power consumption and harmonics generation by the first converter on the AC side of the hybrid converter apparatus. As before, the "second converter" here comprises a self-commutated current source converter.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
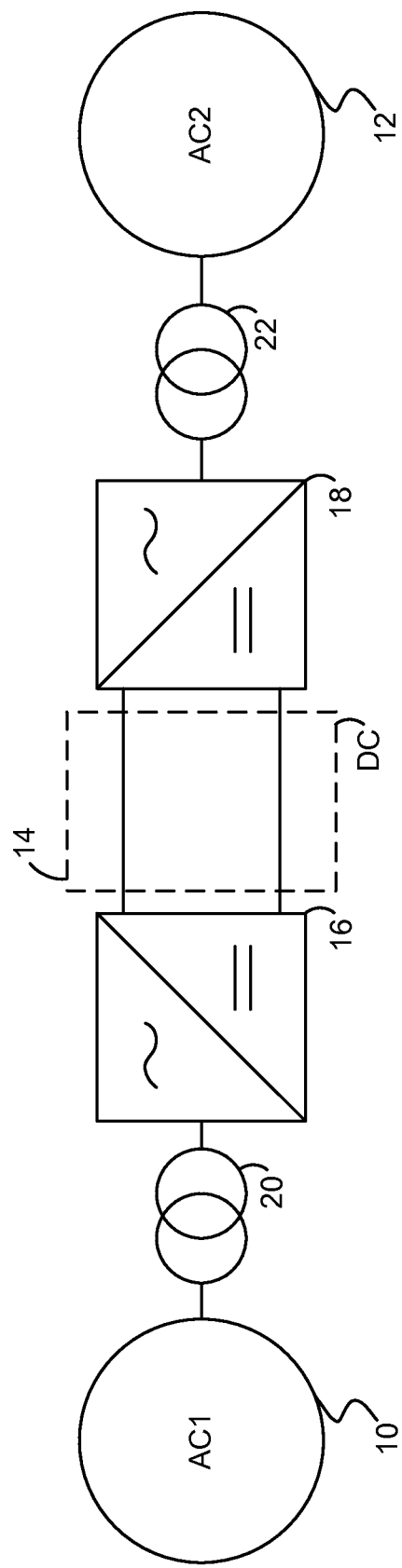
FIG. 1 is a general block diagram of a known converter arrangement used for transferring electrical power between AC and DC power systems.
Figure 2:
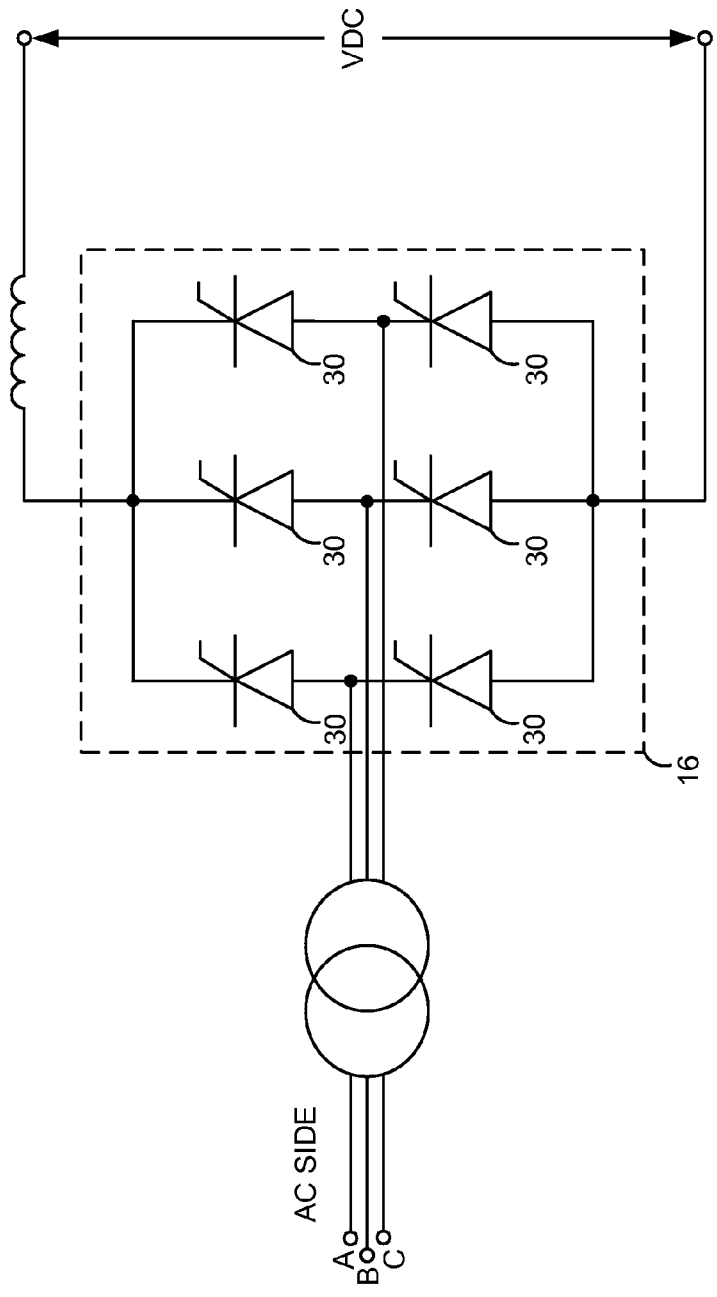
FIG. 2 is a schematic diagram illustrating example details for a known configuration of converter stations as may be used in FIG. 1, based on line commutated current source converters.
Figure 3:
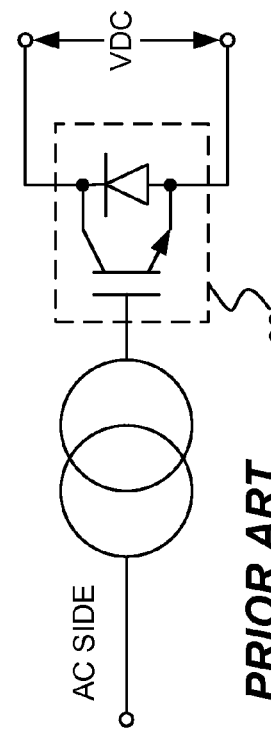
FIG. 3 is a schematic diagram illustrating example details for a known configuration of converter stations as may be used in FIG. 1, based on self-commutated voltage source converters.
Figure 4:
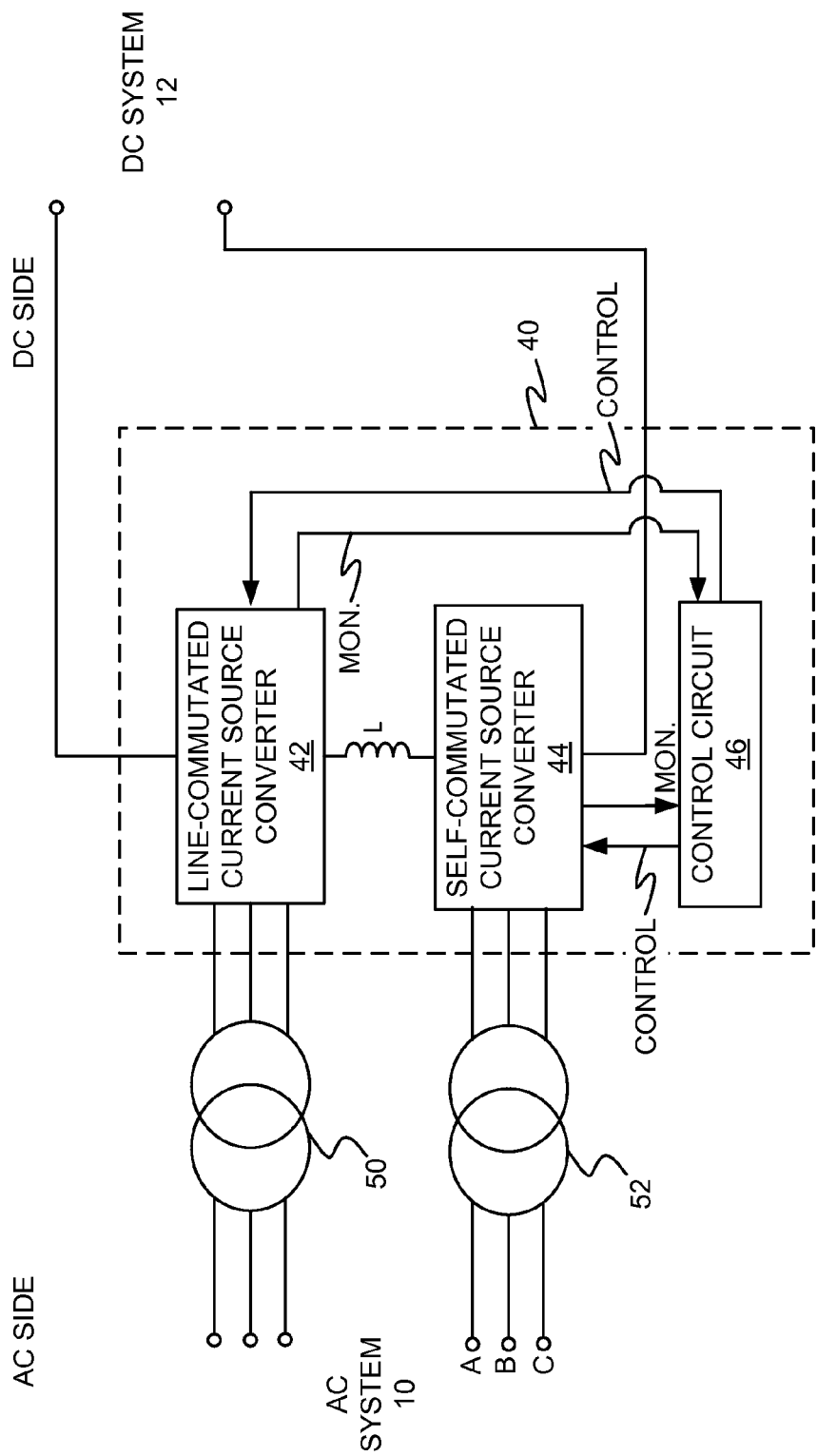
FIG. 4 is a block diagram of a hybrid converter apparatus according to one embodiment taught herein, wherein the hybrid converter apparatus combines a line-commutated current source converter with a self-commutated current source converter.

FIG. 4 illustrates a hybrid converter apparatus 40 configured for coupling to an AC power system 10 on an AC side of the hybrid converter apparatus 40, and configured for coupling to a DC power system 12 on a DC side of the hybrid converter apparatus. The hybrid converter apparatus 40 includes a line-commutating current source converter 42, referred to herein as a "first converter" 42. While not shown explicitly in FIG. 4, the first converter 42 comprises a plurality of line-commutated bidirectional voltage-blocking switches coupled between first AC-side and DC-side connections and is configured for transferring electrical power between the AC and DC power systems 10 and 12, based on converting AC voltage to DC voltage or vice versa.

The first AC-side connections are at the transformer(s) 50 used to connect the first converter 42 to the AC power system 10, while the first DC-side connections connect to one or more DC poles of the DC system 12. The hybrid converter apparatus 40 further includes a self-commutating current source converter 44, which is referred to herein as a "second converter" 44. While not explicitly shown in FIG. 4, the second converter 44 includes a plurality of self-commutated bidirectional voltage-blocking switches coupled at least to the AC power system 10 through second AC-side connections at the transformer(s) 52 used to couple the second converter 44 to the AC power system 10.

The hybrid converter apparatus 40 further includes a control circuit 46 that is configured to control commutation of the second converter 44, to compensate for at least one of reactive power consumption and harmonics generation by the first converter 42 on the AC side. For example, in one embodiment, the control circuit 46 is configured to compensate for reactive power consumption and/or harmonics generation by the first converter 42, based on being configured to generate commutation control signals for the second converter 44 as a function of the difference between a measured current waveform and a reference waveform.

The measured current waveform corresponds to AC current arising on the AC side from operation of the first converter 42 and in one example the reference waveform is a nominal AC current waveform having a desired power factor. Here, "desired" connotes a targeted or setpoint value for the power factor and the control circuit 46 is configured to generate the commutation control signals for the second converter 44, to reduce a difference between the measured current waveform and the nominal AC current waveform. That is, the control circuit 46 is configured to dynamically control commutation of the second converter 44 to minimize the error between a nominal AC current waveform desired for the first converter 42 and the actual AC current waveform of the first converter 42, as known from the measured current waveform.

Here, it will be appreciated that the various waveforms at issue may be represented in the analog or digital domains, and that the waveforms may be multiphase. That is, in one or more embodiments, the AC power system 10 is a three-phase power system and the measurements and control undertaken by the control circuit 46 are with respect the three phases. It will also be appreciated that the control circuit 46 includes or is associated with various monitoring and/or communication circuits, to obtain the various measurements needed for control. For example, in some embodiments, the control circuit 46 is configured to generate the commutation control signals for the second converter 44 and firing angle control signals for the first converter 42, in response to at least one of: monitoring the DC side voltage and current, monitoring the AC side voltage and current with respect to the first converter, and monitoring the AC side voltage and current with respect to the second converter 44. It monitors these one or more parameters directly or communicates with distributed monitoring circuits that output signals or values representing the monitored parameter(s).

FIG. 4 depicts the first and second converters 42 and 44 as being interconnected in a stacked arrangement, which is one embodiment contemplated herein. In particular, according to the depicted stacked arrangement, each one of the first and second converters 42 and 44 are exposed to a corresponding fraction of the DC voltage during operation, and each converter 42 or 44 provides a portion of the electrical power transferred between the AC and DC power systems 10 and 12.

In such arrangements, the control circuit 46 is, in conjunction with controlling the second converter 44 to compensate for the reactive power consumption and the harmonics generation of the first converter 42, further configured to control commutation of the second converter 44 and firing angles of the first converter 42 according to a targeted transfer of electrical power—such as may be indicated via input control signaling to the control circuit 46.

According to the topology shown in FIG. 4, those of ordinary skill in the art will appreciate that the DC side voltage VDC=f($\alpha$), where "$\alpha$" denotes the firing angle(s) of the thyristors 30 comprising the first converter 42. The DC side current IDC is also a function of the firing angle and may be denoted as IDC=g($\alpha$). However, it is recognized herein that controlling reactive power and harmonics on the AC side may be addressed in one of two ways. Based on the type of switching elements or blocks used to implement the second converter 44, it will either appear as a variable inductor, or a variable voltage source. It is highly desirable for the second converter 44 to be at a fraction of the total voltage, and it is preferable to effect control of the DC side current using the second converter 44.

Working from the two-port model depicted in the figure, the second converter 44 can be can be modeled as a voltage source on the DC-side and this implies the need for an inductor L to be connected on the DC side of the second converter 44 to function as an energy storage element. In particular, according to the topology depicted in FIG. 4, the second converter 44 can be represented as a current source on the AC side and correspondingly as a voltage source on the DC side. The first converter 42 can use the same inductor L for energy storage.

With respect to power balance on the AC and DC sides, the second converter 44 may be used to control the DC side current, while the first converter 42 may be used as the primary voltage-blocking component. However, the second converter 44 must be rated at a significant voltage with respect to the first converter 42 and both converters 42 and 44 use bidirectional voltage-blocking switches, and can reverse their DC side voltages to reverse the direction of the power transfer.

In one example, e.g., where the first converter 42 is arranged as a twelve-pulse thyristor-based converter, the second converter 44 may be controlled via the control circuit 46, for operation as a static synchronous compensator or STATCOM, for compensation of reactive power consumption and harmonics generation by the first converter 44. In at least one such embodiment, the second converter 44 is controlled for compensation of the fifth harmonic component and the second converter is rated at or above thirty-five percent of the overall voltage rating of the hybrid converter apparatus 40.

Figure 5:
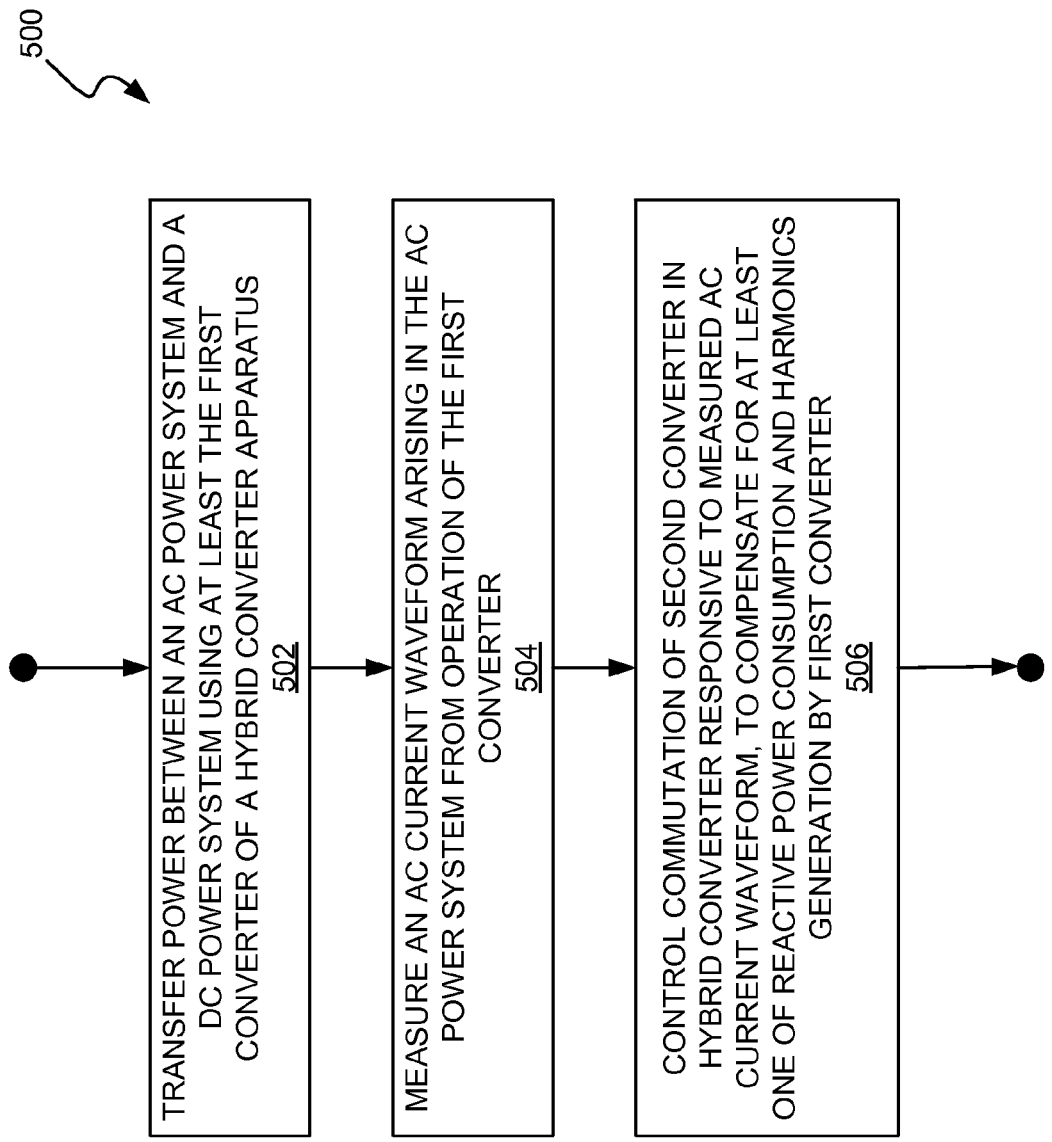
FIG. 5 is a logic flow diagram of one embodiment of a method of operating a hybrid converter apparatus.

FIG. 5 illustrates one embodiment of a method 500 of hybrid apparatus control, such as may be implemented by the control circuit 46. In this regard, it will be appreciated that the control circuit 46 comprises fixed circuitry and/or programmed circuitry. In some embodiments, the control circuit 46 comprises a computer system that includes one or more microprocessors, along with supporting interface and storage circuitry, where the microprocessor(s) are specially adapted to perform the processing operations comprising the method 500, based on the execution of computer program instructions stored in a computer-readable medium in or accessible to the control circuit 46.

Regardless of the circuit-related implementation details, the method 500 comprises a series or set of operations and it should be understood that the order of such operations may deviate from that suggested by the illustration. Further, it will be appreciated that the processing steps 502, 504 and 506 of the method 500 may themselves comprise a number of sub-operations and that such processing may be repeated or otherwise be carried out on an ongoing basis, responsive to dynamically changing conditions.

With these qualifications in mind, the method 500 includes transferring (Block 502) power between AC and DC power systems 10 and 12 using at least the first converter 42 of a hybrid converter apparatus 40. That is, depending on the circuit topology of the hybrid converter apparatus 40, conversion of power from AC to DC or vice versa may be done solely with the first converter 42, or may be done jointly using the first and second converters 42 and 44.

In either case, the method 500 broadly includes measuring (Block 504) the AC current waveform arising in the AC power system 10 from operation of the first converter 42—e.g., at the transformers(s) 50 shown in FIG. 4. The method 500 further includes controlling (Block 506) commutation of the second converter 44 of the hybrid converter apparatus 40 responsive to the measured AC current waveform, to compensate for at least one of reactive power consumption and harmonics generation by the first converter 42. According to these teachings, the hybrid converter apparatus 40 offers operational advantages over power conversion using solely line-commutated or solely self-commutated current source converters.

As a non-limiting example, the stacked arrangement of the converters 42 and 44 as depicted in FIG. 4 offers the two-fold advantage of using the second converter 44 to reduce or eliminate reactive power compensation and/or harmonics filtering that would otherwise be needed on the AC side of the first converter 42, while simultaneously using the first converter 42 to reduce the amount of DC voltage to which the second converter 44 is exposed to on the DC side. That is, in the stacked arrangement of the converters 42 and 44, the overall total DC voltage is provided in part by the first converter 42 and in part by the second converter 44.

Figure 6:
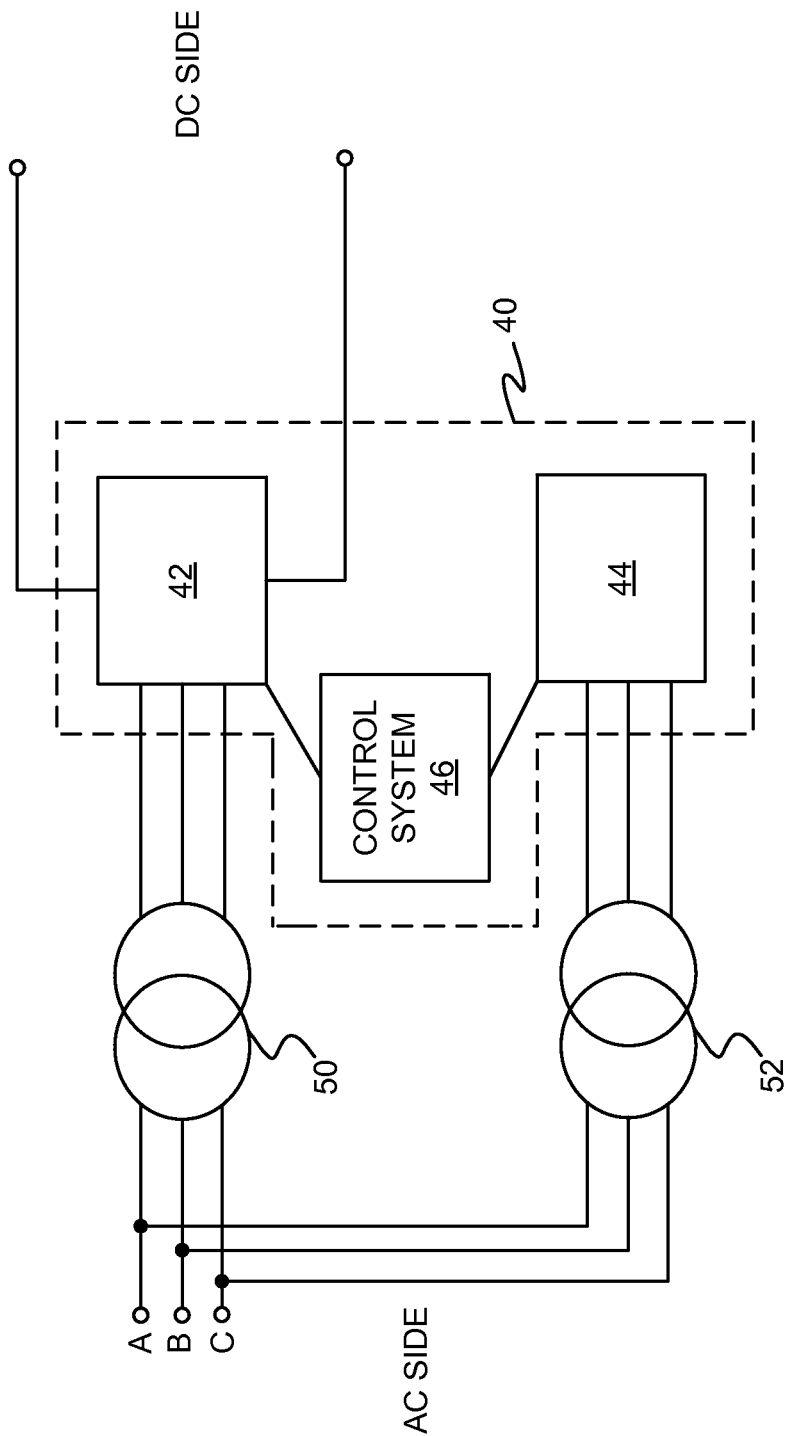
FIG. 6 is a block diagram of a hybrid converter apparatus according to another embodiment taught herein.

However, the AC side advantages apply regardless of whether the stacked arrangement is used. For example, FIG. 6 depicts an alternative embodiment in which the power conversion is handled by the first converter 42, while the second converter 44 is used for compensation only, on the AC side. Here, the first and second converters 42 and 44 are coupled in parallel on the AC side with respect to the AC power system 10 via transformers 50 and 52, with the first converter 42 configured for transferring electrical power between the AC and DC power systems 10 and 12 and exposed fully to the DC voltage on the DC side of the hybrid converter apparatus 40. The second converter 44 is configured only for reactive power and/or harmonics compensation on the AC side of the hybrid converter apparatus 40.

In conjunction with controlling the second converter 44 to compensate for the reactive power consumption and/or the harmonics generation of the first converter 42, the control circuit 46 is configured to control firing angles of the first converter 42 to effect a targeted transfer of electrical power between the AC and DC power systems 10 and 12. That is, the control circuit 46 controls the first converter 42 to convert electrical power from AC to DC or vice versa, according to a targeted DC voltage and/or power transfer direction, and the control circuit 46 controls the second converter 44 to compensate for the AC side reactive power consumption and harmonics generation associated with operation of the first converter 42. In this regard, the control circuit 46 may be programmed or otherwise configured to set the target voltages or target power transfer, or it may include a command/control interface for receiving such inputs from another node or entity.

Figure 7:
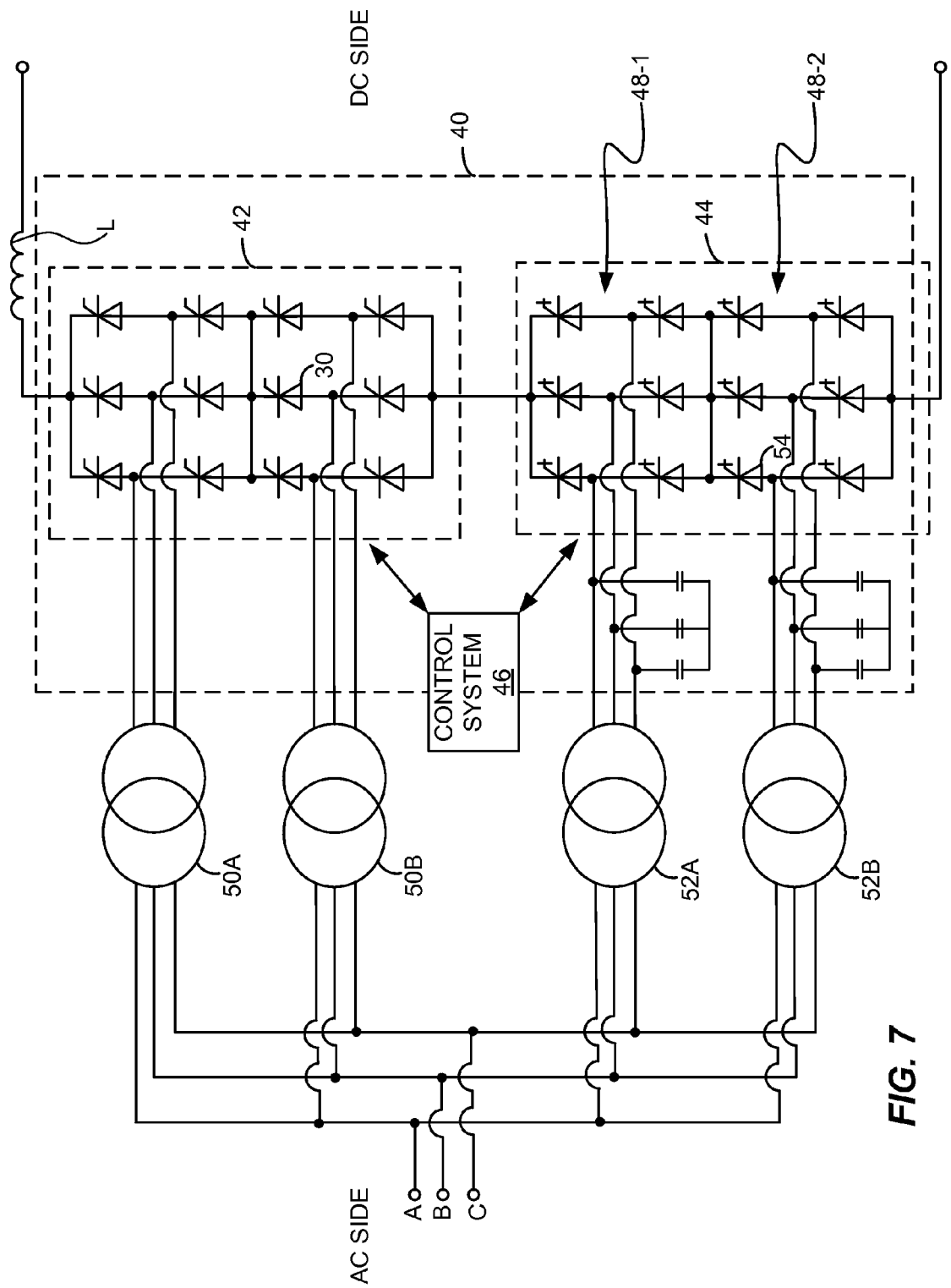
FIG. 7 is a schematic diagram of example details for one embodiment of a hybrid converter apparatus.

FIG. 7 illustrates a particular embodiment of the hybrid converter apparatus 40. The first converter 42 is coupled on the AC side to the three phases A, B, C of the AC power system 10 through transformers 50A and 50B. The second converter 44 is coupled to the AC power system 10 on the AC side via transformers 52A and 52B, and the overall stacked arrangement of first and second converters 42 and 44 provide the overall DC output voltage on the DC side.

The first converter 42 is configured as a twelve-pulse converter comprising a plurality of line-commutated bidirectional voltage-blocking switches 30—shown here as being thyristor-based switches—and the second converter 44 comprises two or more self-commutated current source converter bridges 48 made up from a plurality of IGBTs or other self-commutated bidirectional voltage-blocking switches 54. The thyristors 30 and switches 54 are bidirectional voltage-blocking switches and those characteristics will be understood hereafter, even if not explicitly noted.

Notably, the diagram depicts a plurality of switches 54 arranged as two bridges 48-1 and 48-2 that are stacked together to increase the total voltage rating of the second converter 44. In this embodiment, only one DC reactor L is needed for the energy buffering of both the first and second converters 42 and 44. The DC reactor L here is connected in series with both the first converter 42 and the second converter 44 on the DC side.

Figure 8A:
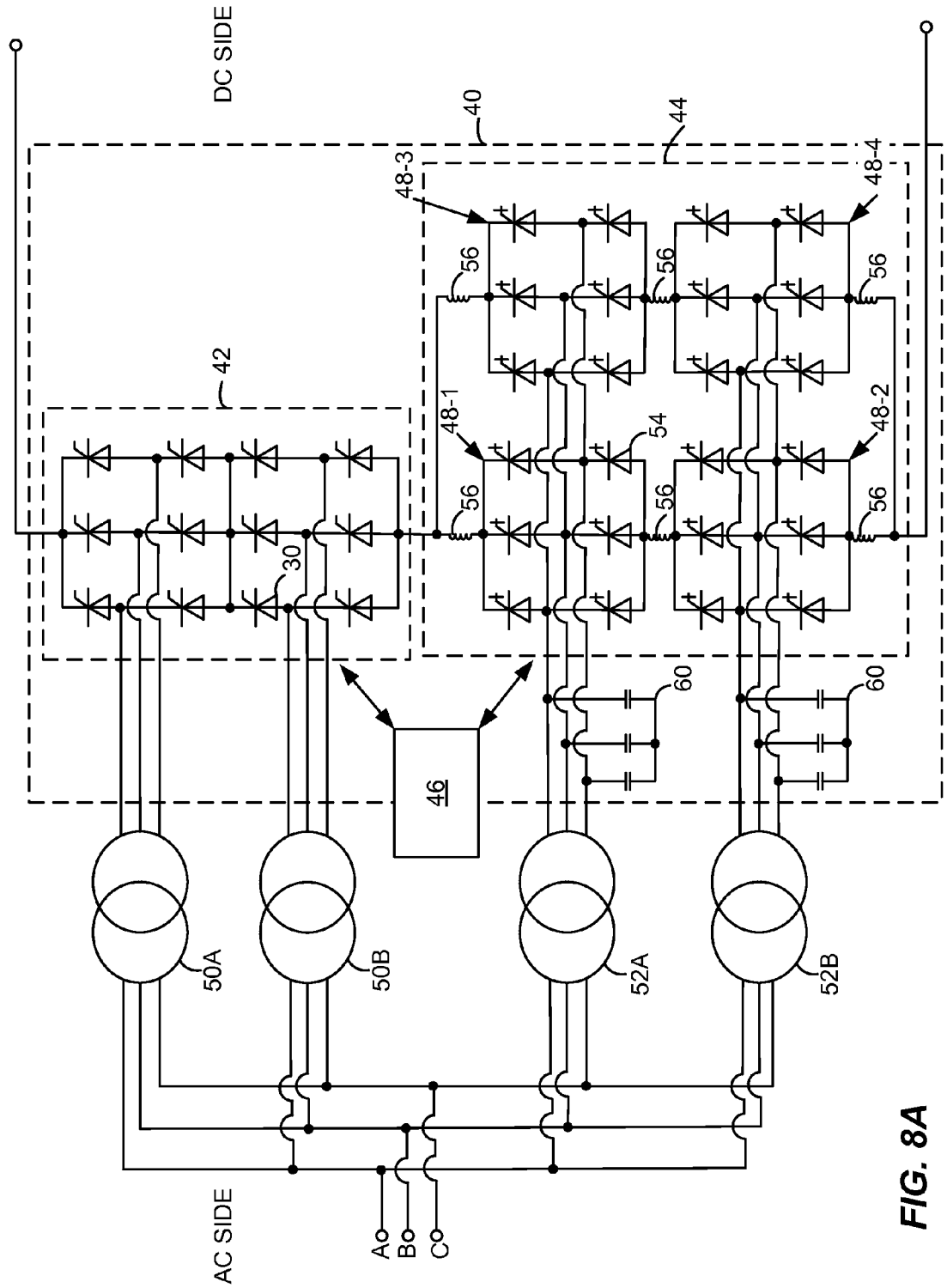
FIGS. 8A and 8B are schematic diagrams of example details in which a self-commutated current source converter includes multiple converter bridges in parallel, for increased current rating.

FIG. 8A illustrates another embodiment in which the bridges 48 are in a stacked and parallel arrangement that offers both voltage scaling and current sharing advantages. For example, the bridges 48-1 and 48-2 are stacked such that each one is exposed to only a portion of the DC voltage seen by the second converter 44, which is also true for the bridges 48-3 and 48-4. Further, the overall current through the second converter 44 splits between the parallel arrangement of bridges 48-1/48-2 and 48-3/48-4. Further note that the energy buffering inductors 56 are distributed within the circuitry comprising the second converter 44.

Still further, the parallel connections of bridges 48-1 and 48-3 form a multilevel current source module, as do the parallel bridges 48-2 and 48-4. Advantageously, by increasing the number of parallel-connected bridges, the number of AC current levels increases, and the switching frequency of each switch or device 54 can be reduced without distorting the AC current waveform.

Broadly, the second converter 44 in one or more embodiments comprises a series arrangement of two or more multilevel current source modules having a common DC link, each module including corresponding self-commutating switches, e.g., switches 54, and being exposed to a fraction of an overall DC voltage that is distributed across the series arrangement. Correspondingly, the second converter 44 in one or more embodiments is configured to connect on the AC side using per module transformer connections.

Figure 8B:
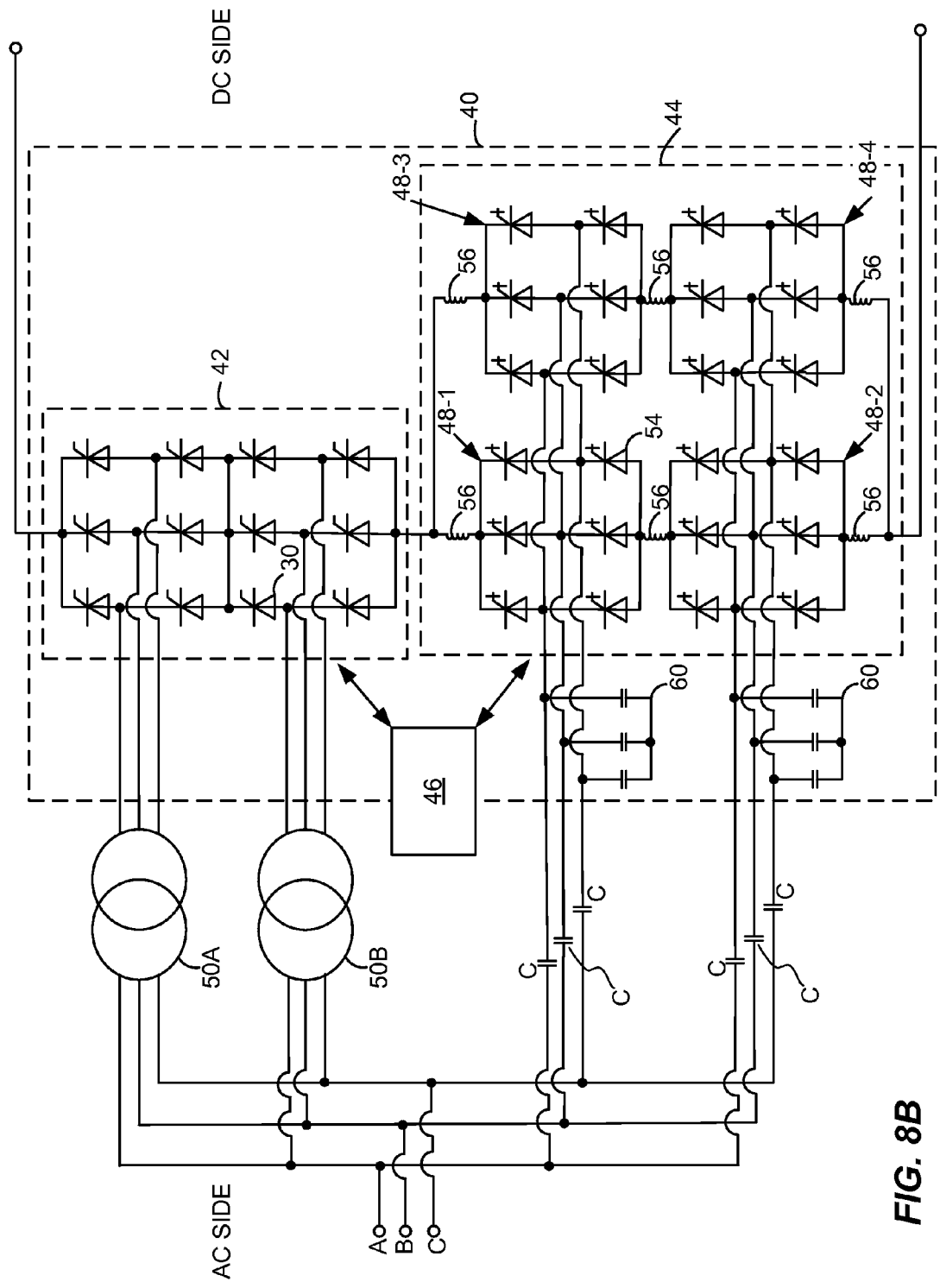

As an alternative to using the per module transformer connection, a plurality of actively controlled capacitors connected in series on the AC side may be configured to create a DC voltage shift on the AC side that enables the DC side stacked connection. In the example of FIG. 8B, the transformers 52A and 52B can be replaced by series capacitors C to create a DC voltage shift on the AC-side.

Figure 9:
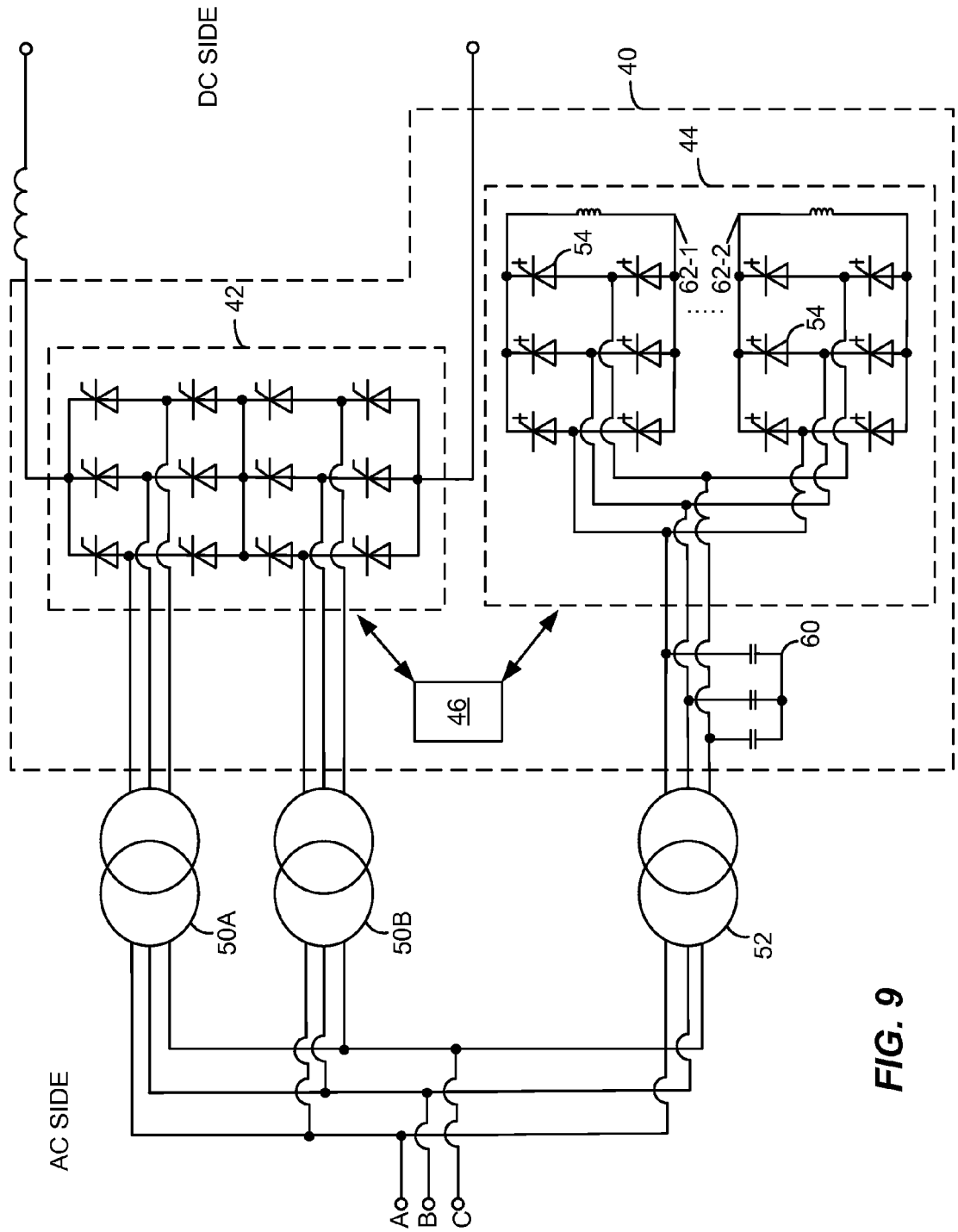
FIG. 9 is a schematic diagram of example details for another embodiment of a hybrid converter apparatus, for use in a hybrid converter apparatus.

FIG. 9 illustrates another embodiment, wherein the second converter 44 comprises parallel bridges 62 of switches 54. Two such bridges 62-1 and 62-2 are depicted. The second converter 44 here is configured as a multilevel current source converter, wherein each bridge 62 shares a fraction of the total current on the AC side. By connecting the bridges 62-1 and 62-2 in parallel and forming a multilevel current source converter, the switching frequency of each device 54 can be reduced, while the reference current for compensating reactive power and harmonics from the first converter 42 can still be effectively synthesized.

Figure 10:
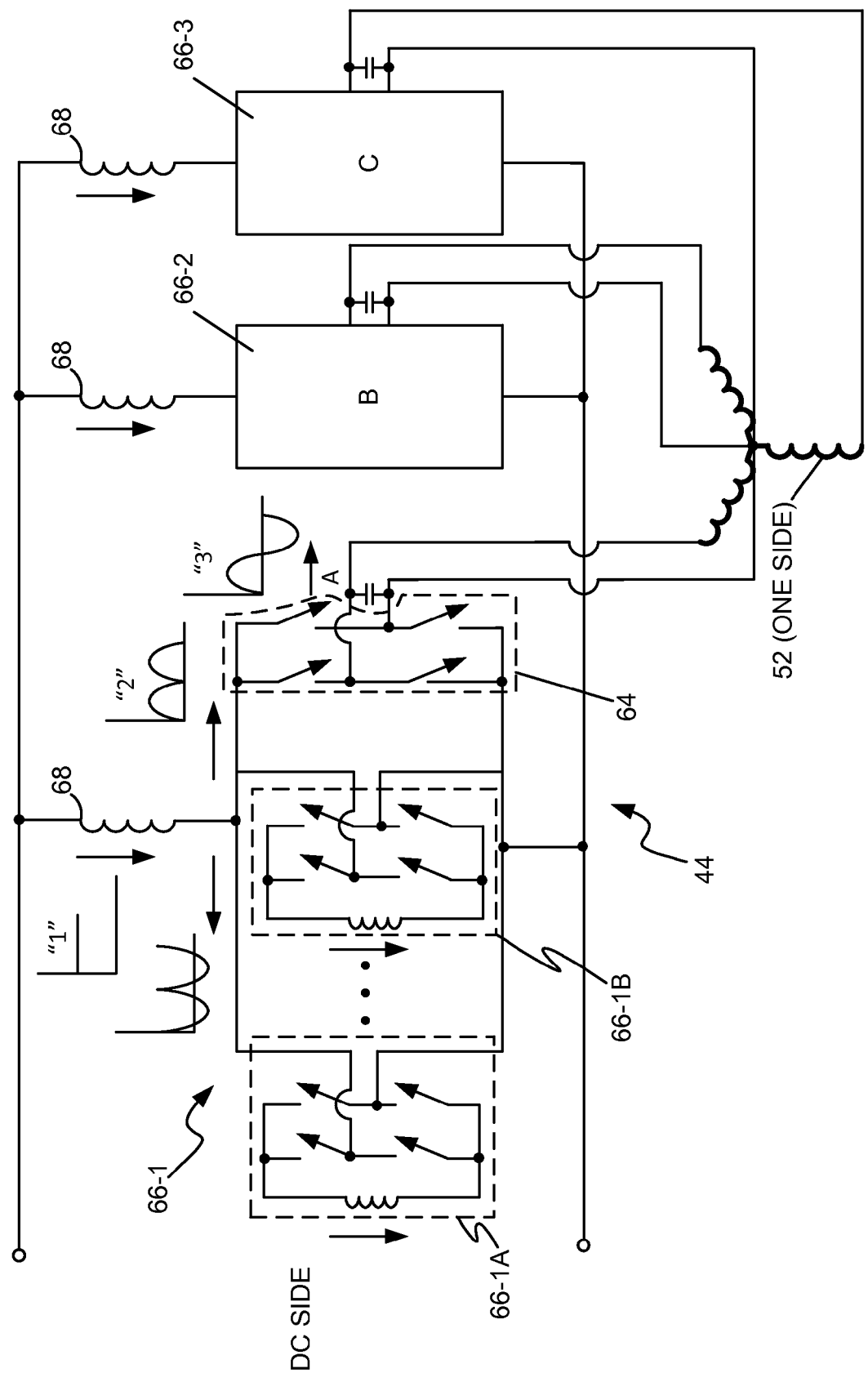
FIG. 10 is a schematic diagram illustrating another embodiment for a self-commutated current source converter, for use in a hybrid converter apparatus.
Figure 11:
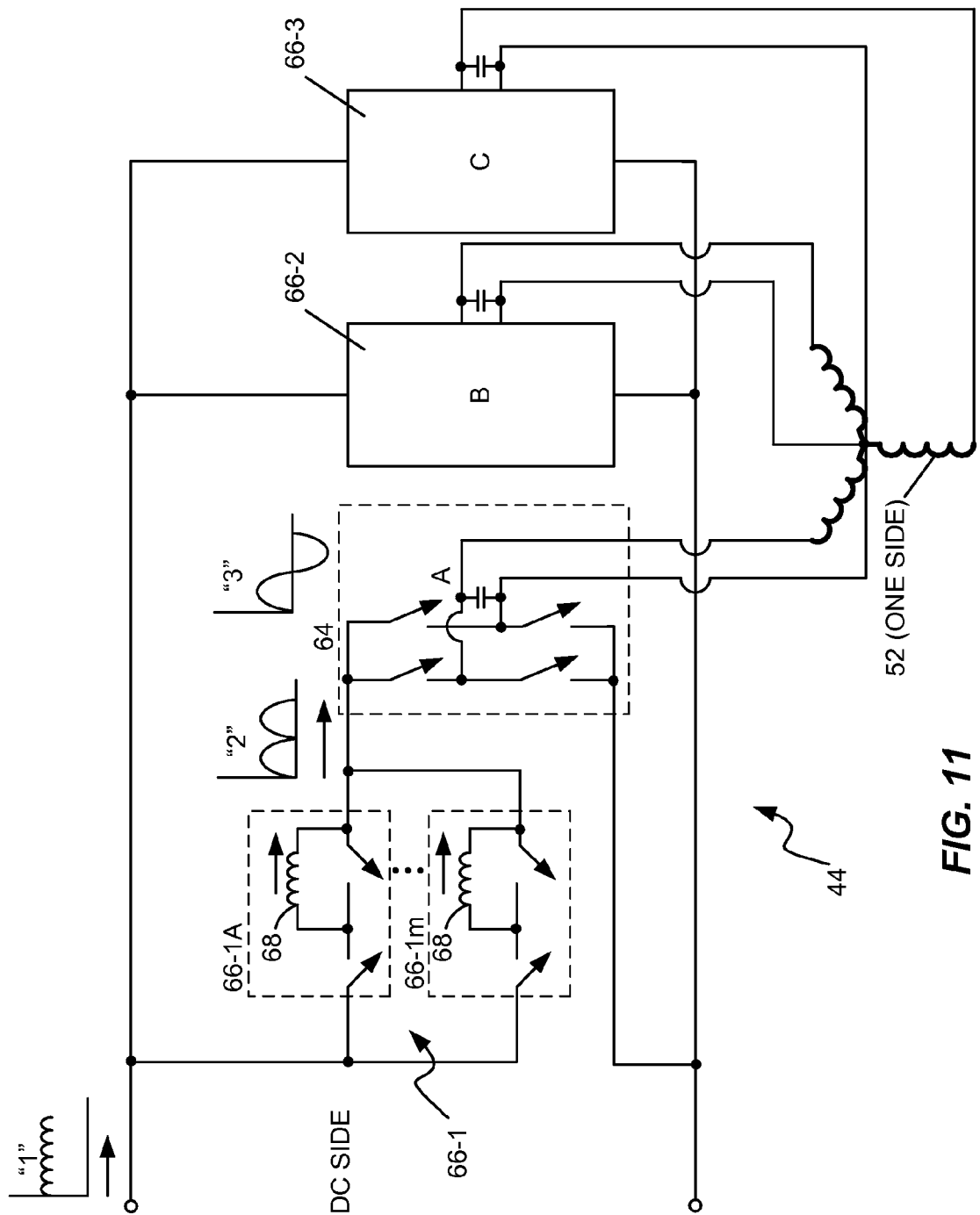
FIG. 11 is a schematic diagram illustrating yet another embodiment for a self-commutated current source converter, for use in a hybrid converter apparatus.

FIG. 10 is another embodiment for the second converter 44. Multiple parallel-connected switched-inductor modules 66 are connected in parallel with an output H-bridge converter 64. Modules 66-1, 66-2 and 66-3 are illustrated. Each switched-inductor module 66 shapes a DC current "1", supplied from an inductor 68, into a rectified AC wave "2". The parallel-connected switched-inductor cells 66-1A and 66-1B are step-controlled to perform this current shaping. The output H-bridge converter 64 changes the rectified AC wave "2" into a AC wave "3" current at its output. FIG. 11 depicts a similar but alternate arrangement for the second converter 44. In one or more embodiments, the switches in the output H-bridge are operated at a fundamental frequency of the AC power system 10.

Figure 12:
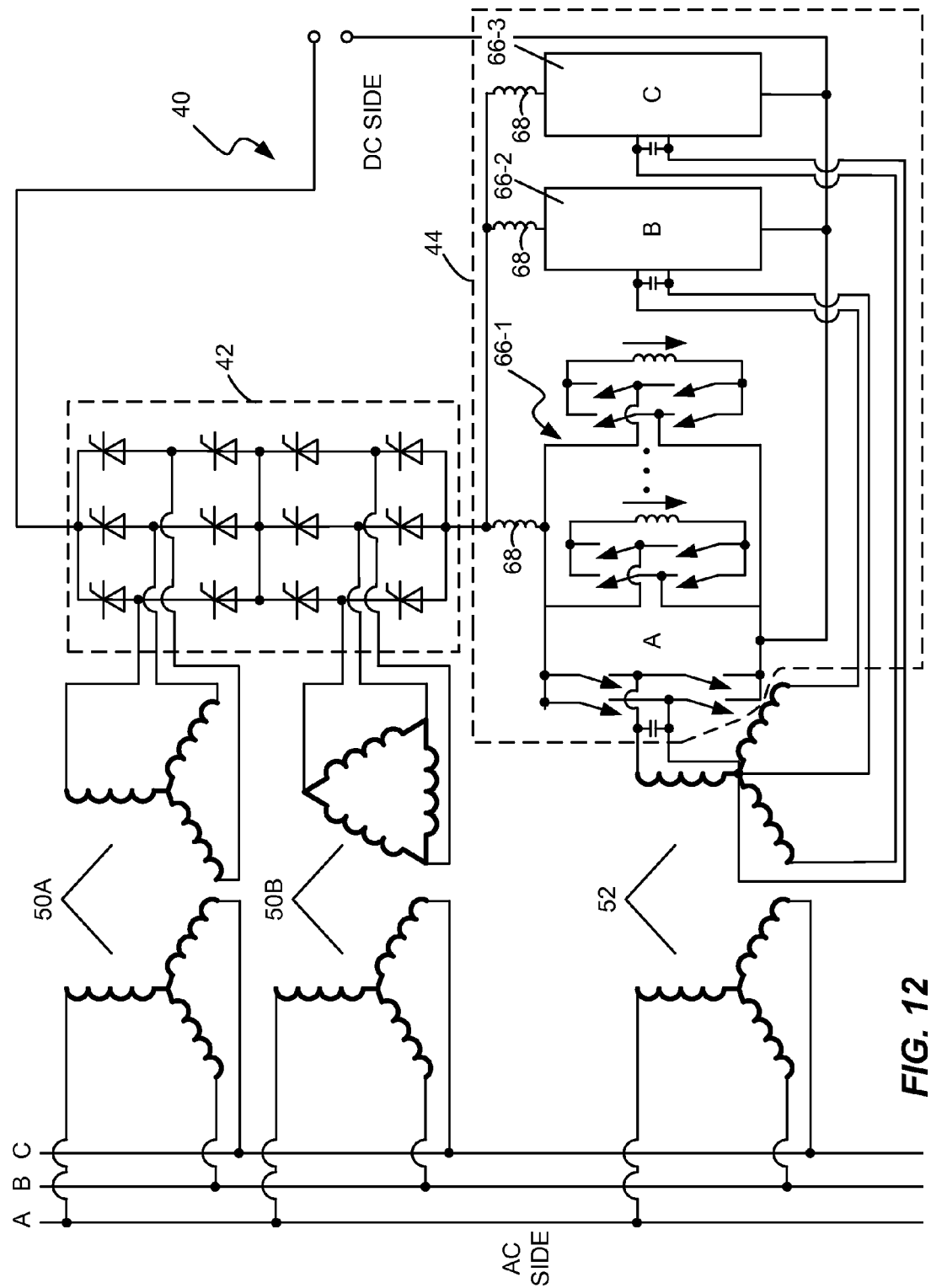
FIG. 12 is a schematic diagram of one embodiment of a hybrid converter apparatus according to a parallel hybrid current source topology.
Figure 13:
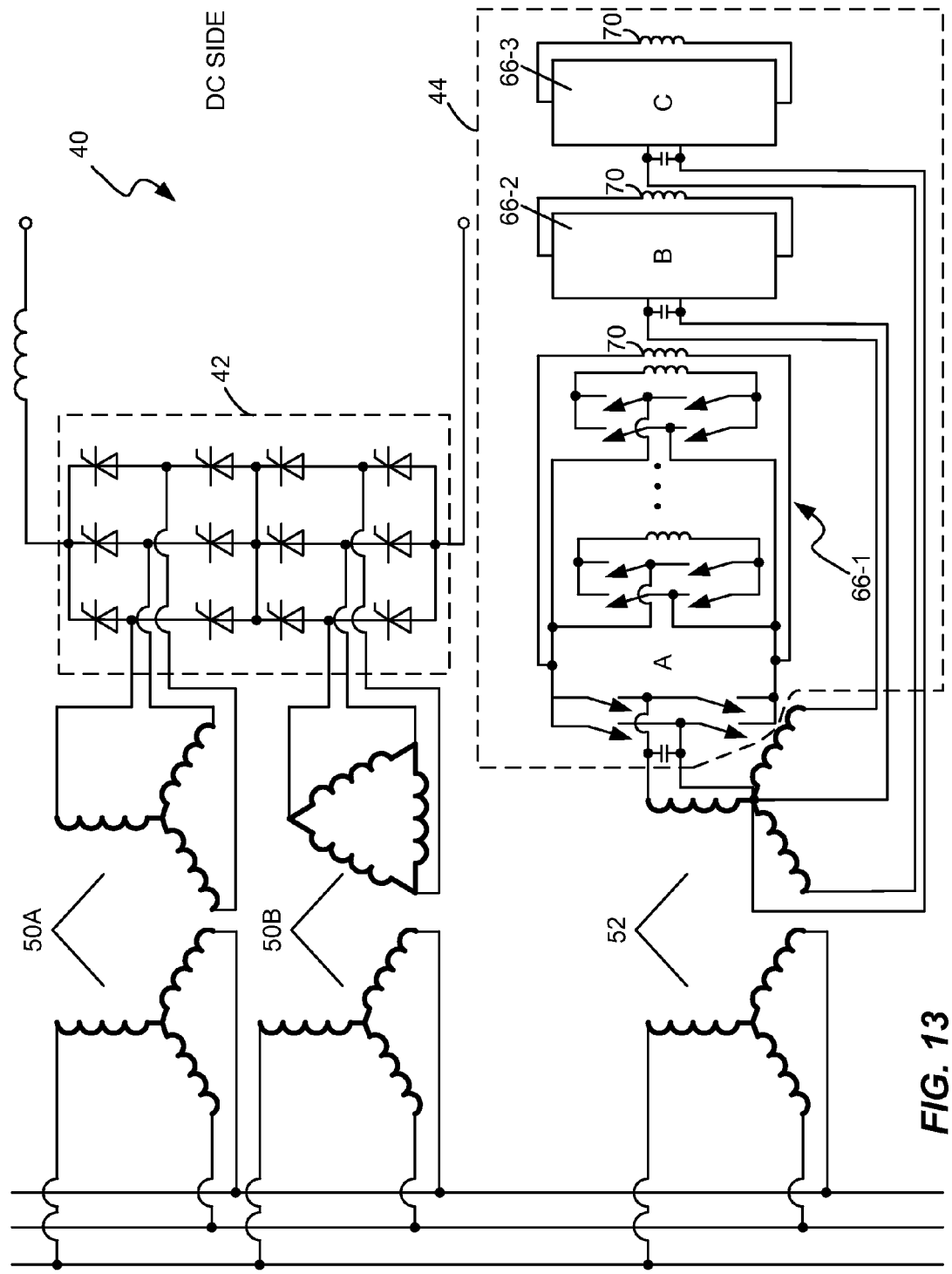
FIG. 13 is a schematic diagram of another embodiment of a hybrid converter apparatus according to a parallel hybrid current source topology.

FIGS. 12 and 13 illustrate different arrangements for the hybrid converter apparatus 40, using the second converter 44 as shown in FIG. 10. In particular, FIG. 12 shows a stacked arrangement where the first and second converters 42 and 44 together provide the DC voltage, while FIG. 13 illustrates a parallel arrangement where the second converter 44 is operated to compensate on the AC side, with respect to the reactive power consumption and harmonics generation of the first converter 42. Note that the inductors 68 shown in FIG. 12 and the inductors 70 shown in FIG. 13 carry the same DC current, and they all function as energy storage for the converter modules 66 used to form the second converter 44.

Figure 14:
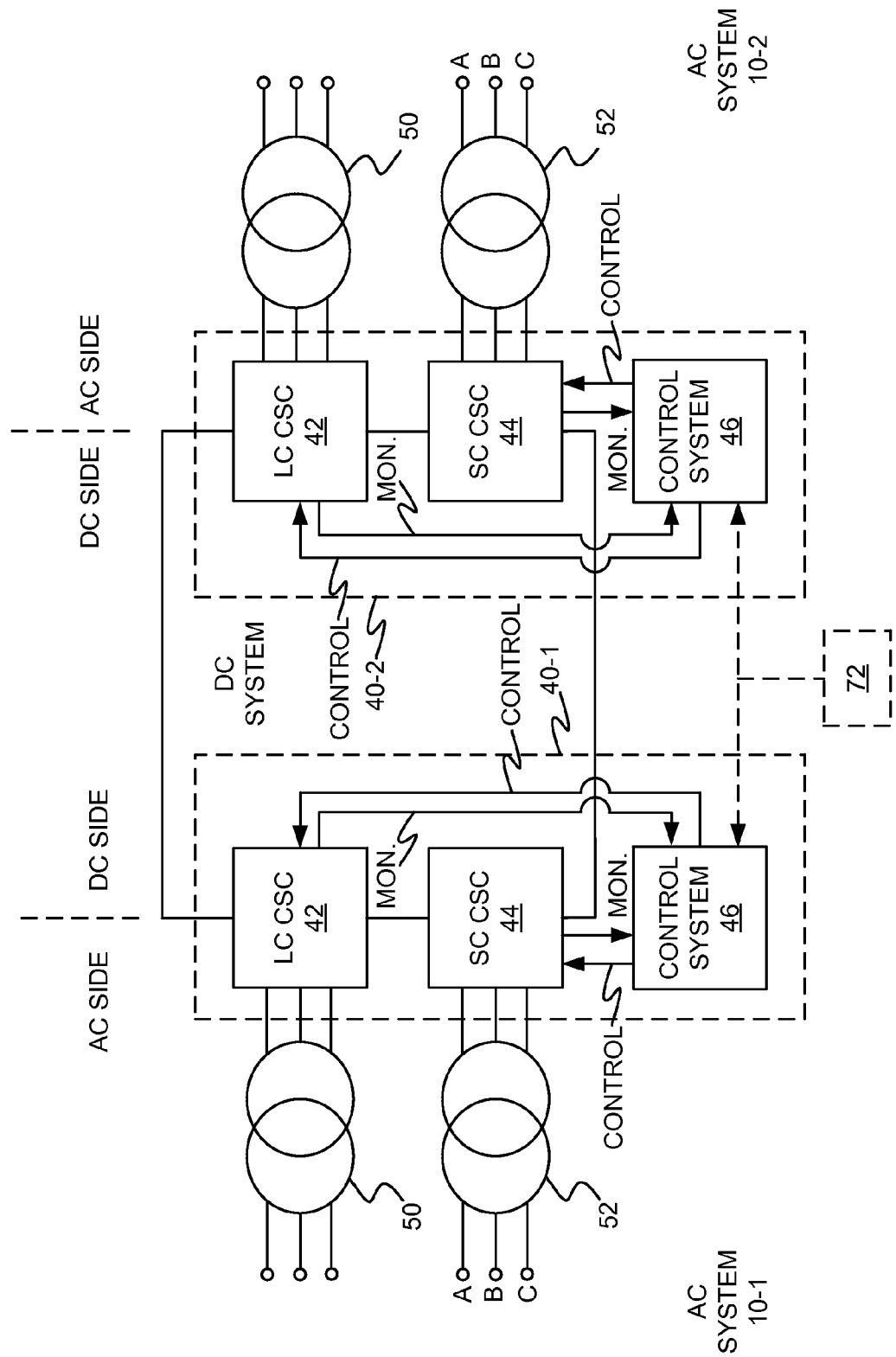
FIG. 14 is a schematic diagram of another embodiment of the hybrid converter apparatus according to a back-to-back converter configuration.

FIG. 14 illustrates a back-to-back arrangement of hybrid converter apparatuses 40, shown here as hybrid converter apparatuses 40-1 and 40-2. The hybrid converter apparatus 40-1 couples on its AC side to the AC power system 10-1, while the hybrid converter apparatus 40-2 couples on its AC side to the AC power system 10-2. The two control systems 46 may cooperatively control the hybrid converter apparatuses 40-1 and 40-2 to effect the targeted power transfer between the AC power systems 10-1 and 10-2, via HVDC transmission between the two apparatuses 40-1 and 40-2, or a centralized control circuit 72 may be configured to monitor and control the two apparatuses 40-1 and 40-2, for such control.

With the above examples in mind, the teachings herein may be broadly understood as combining an HVDC Classic or other such line-commutated current source converter—the "first converter 42" herein—with a self-commutated current source converter—the "second converter 44" herein—based on connecting them through transformers on the AC side and optionally stacking them on the DC side. The first converter 42 uses line-commutated switches 30, i.e., thyristors having a controllable-turn-on and bidirectional-voltage-blocking, which commutates current once after every zero crossing of the AC line-to-line voltages. As a result, first converter 42 consumes significant reactive power and its AC current contains significant harmonic components.

Advantageously, however, the second converter 44 as configured and controlled herein uses fully controllable switching devices 54—i.e., power electronics having controllable turn on and controllable turn off and bidirectional-voltage-blocking. These devices 54 commutate current independent of the AC line voltages and can do so as many times as are needed per AC cycle. The difference between the desired AC current waveform—e.g., a sinusoidal current at unity power factor—and the actual AC current of the first converter 42 is used as a control reference for the controlling commutation of the second converter 44. In particular, the control circuit 46 generations commutation-control signals for the second converter 44 such that the second converter 44 directly synthesizes its AC current to follow the control reference. Consequently, the second converter 44 actively compensates for the reactive power and harmonics of the first converter 42.

Further, when the first and second converters 42 and 44 are stacked on the DC side, each one of them only needs to be rated for a portion of the total DC voltage. Because both of them are current source converters, they can share the same circuit elements, e.g., inductors, for energy buffering. Additionally, because both of the converters 42 and 44 use bidirectional-voltage-blocking devices, a reversal of power flow through the hybrid converter apparatus 40 can be achieved by simply reversing the DC voltage of both converters 42 and 44.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A hybrid converter apparatus configured for coupling to an AC power system on an AC side and to a DC power system on a DC side, said hybrid converter apparatus comprising:
    a line-commutating current source converter referred to as a first converter and comprising a plurality of line-commutated bidirectional voltage-blocking switches coupled between first AC-side and DC-side connections and configured for transferring electrical power between the AC and DC power systems, based on converting AC voltage to DC voltage or vice versa;
    a self-commutating current source converter, referred to as a second converter and comprising a plurality of self-commutated bidirectional voltage-blocking switches coupled at least to the AC power system through second AC-side connections; and
    a control circuit configured to control commutation of the second converter to compensate for at least one of reactive power consumption and harmonics generation by the first converter on the AC side.

2. The hybrid converter apparatus of claim 1, wherein the control circuit is configured to compensate for at least one of reactive power consumption and harmonics generation by the first converter, based on being configured to generate commutation control signals for the second converter as a function of the difference between a measured current waveform and a reference waveform, said measured current waveform corresponding to AC current arising on the AC side from operation of the first converter.

3. The hybrid converter apparatus of claim 2, wherein the reference waveform is a nominal AC current waveform having a desired power factor, and wherein the control circuit is configured to generate the commutation control signals for the second converter, to reduce a difference between the measured current waveform and the nominal AC current waveform.

4. The hybrid converter apparatus of claim 2, wherein the control circuit is configured to generate the commutation control signals for the second converter and firing angle control signals for the first converter, in response to at least one of: monitoring a DC side voltage and current, monitoring an AC side voltage and current with respect to the first converter, and monitoring the AC side voltage and current with respect to the second converter.

5. The hybrid converter apparatus of claim 1, wherein the first and second converters are interconnected in a stacked arrangement, with each one of the first and second converters being exposed to a corresponding fraction of the DC voltage during operation and each converter providing a portion of the electrical power transferred between the AC and DC power systems, and wherein the control circuit is, in conjunction with controlling the second converter to compensate for the reactive power consumption and the harmonics generation of the first converter, further configured to control commutation of the second converter and firing angles of the first converter according to a targeted transfer of electrical power.

6. The hybrid converter apparatus of claim 1, wherein the first and second converters are coupled in parallel with respect to the AC power system, with the first converter configured for transferring electrical power between the AC and DC power systems and exposed fully to the DC voltage on the DC side of the hybrid converter apparatus, and with the second converter configured only for reactive power and harmonics compensation on the AC side of the hybrid converter system, and wherein, in conjunction with controlling the second converter to compensate for the reactive power consumption and the harmonics generation of the first converter, the control circuit is configured to control firing angles of the first converter to effect a targeted transfer of electrical power between the AC and DC power systems.

7. The hybrid converter apparatus of claim 1, wherein the second converter comprises parallel-connected current source bridges or switched-inductor cells that form a multilevel current source module, and wherein the second converter includes two or more such multilevel current source modules connected in a series arrangement having a common DC link, each multilevel current source module including corresponding self-commutating switches that are exposed to a fraction of an overall DC voltage that is distributed across the series arrangement of multilevel current source modules.

8. The hybrid converter apparatus of claim 1, wherein the second converter is configured to connect on the AC side using per module transformer connections.

9. The hybrid converter apparatus of claim 1, wherein the second converter is configured to connect on the AC side through a plurality of actively controlled capacitors configured to create a DC voltage shift on the AC side.

10. The hybrid converter apparatus of claim 1, wherein the second converter is arranged to have parallel switched-inductor cells that are connected to an output H-bridge.

11. The hybrid converter apparatus of claim 10, wherein the parallel switched-inductor cells are step-controlled to synthesize rectified AC waveforms, and the output H-bridge is used to change the rectified AC waveforms into an AC waveform.

12. The hybrid converter apparatus of claim 11, wherein each switch in the output H-bridge is operated at a fundamental frequency of the AC power system.

13. The hybrid converter apparatus of claim 1, wherein the hybrid converter apparatus is configured in a back-to-back arrangement of two or more hybrid converter apparatuses.

14. A method of transferring electrical power between an AC power system and a DC power system via a hybrid converter apparatus comprising a line-commutated current source converter as a first converter coupled to the AC power system on an AC side of the hybrid converter apparatus and to the DC power system on a DC side of the hybrid converter apparatus, and further comprising a self-commutated current source converter as a second converter coupled at least to the AC power system on the AC side, said method comprising:
    transferring power between the AC and DC power systems, using at least the first converter;
    measuring an AC current waveform arising in the AC power system from operation of the first converter; and controlling commutation of the second converter as a function of the measured AC current waveform, to compensate for at least one of reactive power consumption and harmonics generation by the first converter on the AC side of the hybrid converter apparatus.

15. The method of claim 14, wherein the first and second converters are stacked on the DC side to produce a DC voltage on the DC side, and wherein the method includes coordinating commutation control of the second converter with firing angle control of the first converter, to control the transfer of electrical power between the AC and DC power systems.

16. The method of claim 14, wherein converting an AC side voltage to a DC side voltage, or vice versa, is done using only the first converter, and wherein the method includes controlling a firing angle of the first converter to control the transfer of electrical power between the AC and DC power systems, in conjunction with controlling the second converter to compensate for at least one of the reactive power consumption and the harmonics generation by the first converter on the AC side of the hybrid converter apparatus.

* * * * *